United States Patent
Kim

(10) Patent No.: US 11,434,852 B2
(45) Date of Patent: Sep. 6, 2022

(54) RECIRCULATION PIPE AND ENGINE SYSTEM INCLUDING THE SAME

(71) Applicants: HYUNDAI MOTOR COMPANY, Seoul (KR); KIA MOTORS CORPORATION, Seoul (KR)

(72) Inventor: Jongcheon Kim, Bucheon-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 17/217,611

(22) Filed: Mar. 30, 2021

(65) Prior Publication Data

US 2022/0106931 A1    Apr. 7, 2022

(30) Foreign Application Priority Data

Oct. 7, 2020    (KR) .................. 10-2020-0129348

(51) Int. Cl.

| | |
|---|---|
| *F02M 26/17* | (2016.01) |
| *F02M 26/14* | (2016.01) |
| *F02B 75/18* | (2006.01) |
| *F16L 27/111* | (2006.01) |
| *F01N 13/18* | (2010.01) |
| *F02M 26/12* | (2016.01) |

(52) U.S. Cl.
CPC .......... *F02M 26/17* (2016.02); *F01N 13/1816* (2013.01); *F02B 75/18* (2013.01); *F02M 26/12* (2016.02); *F02M 26/14* (2016.02); *F16L 27/111* (2013.01)

(58) Field of Classification Search
CPC .......... F02M 26/17; F02M 26/14; F02B 75/18
See application file for complete search history.

(56) References Cited

U.S. PATENT DOCUMENTS

| | | | | |
|---|---|---|---|---|
| 3,096,104 | A * | 7/1963 | Browning | F16L 51/029 138/28 |
| 4,854,416 | A * | 8/1989 | Lalikos | F16L 27/111 138/131 |
| 5,158,061 | A * | 10/1992 | Monteith | F02M 26/14 285/299 |
| 5,340,165 | A * | 8/1994 | Sheppard | F01N 13/1811 285/227 |
| 5,609,144 | A * | 3/1997 | Seizew | F02M 26/12 123/568.11 |
| 5,829,483 | A * | 11/1998 | Tukahara | F16L 9/18 138/121 |

(Continued)

FOREIGN PATENT DOCUMENTS

| | | |
|---|---|---|
| EP | 0889210 A1 | 1/1999 |
| KR | 100735940 B1 | 7/2007 |
| KR | 101465368 B1 | 11/2014 |

*Primary Examiner* — Carl C Staubach
(74) *Attorney, Agent, or Firm* — McDonnell Boehnen Hulbert & Berghoff LLP

(57) ABSTRACT

A recirculation pipe and an engine system including the same are provided. A recirculation pipe of an EGR apparatus may include a pipe body, and a plurality of bellows tube assemblies formed in the pipe body and including a plurality of bellows tube. One bellows tube assembly among the plurality of bellows tube assemblies and another bellows tube assembly among the plurality of bellows tube assemblies have different shapes.

8 Claims, 8 Drawing Sheets

(56) References Cited

U.S. PATENT DOCUMENTS

| | | | | |
|---|---|---|---|---|
| 5,901,754 | A | * | 5/1999 | Elsasser ................. F16L 27/111 |
| | | | | 181/282 |
| 6,151,893 | A | * | 11/2000 | Watanabe ........... F01N 13/1816 |
| | | | | 285/299 |
| 7,451,785 | B2 | * | 11/2008 | Taira ..................... F01N 13/009 |
| | | | | 138/119 |
| 9,631,751 | B2 | * | 4/2017 | Kim .................... F16L 27/1004 |
| 2003/0137147 | A1 | * | 7/2003 | Girot ....................... F16L 59/21 |
| | | | | 285/47 |
| 2007/0035125 | A1 | * | 2/2007 | Kim ..................... F16L 51/025 |
| | | | | 285/226 |
| 2014/0299115 | A1 | * | 10/2014 | Zhang ................ F28D 21/0003 |
| | | | | 123/568.12 |
| 2017/0152656 | A9 | * | 6/2017 | Webel ..................... E03D 11/02 |

* cited by examiner

RECIRCULATION PIPE AND ENGINE SYSTEM INCLUDING THE SAME

CROSS-REFERENCE TO RELATED APPLICATION

This application claims priority to and the benefit of Korean Patent Application No. 10-2020-0129348 filed in the Korean Intellectual Property Office on Oct. 7, 2020, the entire contents of which are incorporated herein by reference.

BACKGROUND

(a) Field of the Disclosure

The present disclosure relates to a recirculation pipe and an engine system including the same. More particularly, the present disclosure relates to a recirculation pipe and an engine system including the same that can avoid resonance from vibration of an engine and a vehicle.

(b) Description of the Related Art

Nitrous oxide (NOx) contained in exhaust gas emitted from vehicles is restricted as a main air pollutant, and a lot of research has been conducted to reduce emission of NOx.

An exhaust gas recirculation (EGR) system is a system installed in a vehicle to reduce harmful exhaust gases. Generally, NOx is increased when the proportion of air in a mixer is high and combustion is good. Therefore, the EGR system is a system for mixing a portion (for example, 5% to 20%) of an exhaust gas discharged from an engine again in the mixer to reduce the amount of oxygen in the mixer and obstruct combustion, thereby suppressing the occurrence of NOx.

An exhaust gas recirculation (EGR) system for a gasoline engine is mounted in the vehicle in order to improve fuel efficiency. With the EGR system, it is possible to improve fuel economy by advancing the ignition timing by reducing a pumping loss within a low-speed/low-load region and reducing a temperature in the combustion chamber within a medium-speed/medium-load region.

As a representative exhaust gas recirculation system, there is a low pressure exhaust gas recirculation (LP-EGR) apparatus. The LP-EGR apparatus recirculates exhaust gas, which has passed through the turbine of the turbocharger, into an intake passageway at a front end of a compressor.

The EGR apparatus is provided with an EGR cooler for cooling the recirculated exhaust gas. At this time, there is a problem that the recirculation pipe connected to the EGR cooler is destroyed by vibration generated by the running of the vehicle running, or vibration generated in the engine. Particularly, if the natural frequency of the recirculation pipe coincides with the vibration frequency generated during driving of the vehicle or the vibration frequency generated by the engine, resonance occurs in the recirculation pipe and the recirculation pipe is easily destroyed.

The above information disclosed in this Background section is only for enhancement of understanding of the background of the disclosure, and therefore it may contain information that does not form the prior art that is already known in this country to a person of ordinary skill in the art.

SUMMARY

An exemplary embodiment of the present disclosure provides a recirculation pipe and an engine system including the same robust vibration generated in vehicle's driving.

A recirculation pipe of an EGR apparatus is provided according to an exemplary embodiment of the present disclosure. The recirculation pipe may include a pipe body, and a plurality of bellows tube assemblies formed in the pipe body and including a plurality of bellows tubes. One bellows tube assembly among the plurality of bellows tube assemblies and another bellows tube assembly among the plurality of bellows tube assemblies have different shapes.

At least one of a pitch between the bellows tubes and a number of the bellows tubes of one bellows tube assembly among the plurality of bellows tube assemblies may be different from the pitch between the bellows tubes and the number of the bellows tubes of another bellows tube assembly among the plurality of bellows tube assemblies.

The pitch between the bellows tubes and the number of the bellows tubes of one bellows tube assembly among the plurality of the bellows tube assemblies may be different from the pitch between the bellows tubes and the number of the bellows tubes of another bellows tube assembly among the plurality of the bellows tube assemblies, and the pitch between the bellows tubes and the number of the bellows tubes of one bellows tube assembly among the plurality of the bellows tube assemblies may be the same as the pitch between the bellows tubes and the number of the bellows tubes of the other bellows tube assembly among the plurality of the bellows tube assemblies.

The plurality of bellows tube assemblies may include a first bellows tube assembly including a plurality of bellows tubes having a predetermined pitch between the bellows tubes and a number of the bellows tubes, a second bellows tube assembly including a plurality of bellows tubes having a predetermined pitch between the bellows tubes and a number of the bellows tubes different from the pitch between the bellows tubes and the number of the bellows tubes of the first bellows tube assembly, and a third bellows tube assembly including a plurality of bellows tubes having a predetermined pitch between the bellows tubes and a number of the bellows tubes same to the pitch between the bellows tubes and the number of the bellows tubes of the first bellows tube assembly.

The pitch of the first bellows tube assembly may be less than the pitch of the second bellows tube assembly, and the number of the bellows tubes of the first bellows tube assembly may be less than the number of the bellows tubes of the second bellows tube assembly.

The pitch between the bellows tubes of the first bellows tube assembly may be more than the pitch between the bellows tubes of the second bellows tube assembly, and the number of the bellows tubes of the first bellows tube assembly may be less than the number of the bellows tubes of the second bellows tube assembly.

The first bellows tube assembly, the second bellows tube assembly, and the third bellows tube assembly may be sequentially arranged.

The plurality of bellows tube assemblies may include a first bellows tube assembly including a plurality of bellows tube having a predetermined pitch between the bellows tubes and a number of the bellows tubes, and a second bellows tube assembly including a plurality of bellows tubes having a predetermined pitch between the bellows tubes and a number of the bellows tubes different from the pitch between the bellows tubes and the number of the bellows tubes of the first bellows tube assembly.

The pitch between the bellows tubes of the first bellows tube assembly may be less than the pitch between the bellows tubes of the second bellows tube assembly, and the number of the bellows tubes of the first bellows tube assembly may be more than the number of the bellows tubes of the second bellows tube assembly.

The first bellows tube assembly and the second bellows tube assembly may be sequentially arranged.

An engine system according to another exemplary embodiment of the present disclosure may include a plurality of combustion chambers generating power by burning fuel, an intake line through which an intake air supplied to the combustion chamber flows, an exhaust line through which an exhaust gas exhausted from the combustion chamber flows, and an EGR apparatus comprising a recirculation pipe connecting the exhaust line and the intake line to recirculate the exhaust gas flowing through the exhaust line to the combustion chamber. The recirculation pipe may include a pipe body, and a plurality of bellows tube assemblies formed in the pipe body and including a plurality of bellows tubes. One bellows tube assembly among the plurality of bellows tube assemblies and another bellows tube assembly among the plurality of bellows tube assembly have different shapes.

At least one of a pitch between the bellows tubes and a number of the bellows tubes of one bellows tube assembly among the plurality of bellows tube assemblies may be different from the pitch between the bellows tubes and the number of the bellows tubes of another bellows tube assembly among the plurality of bellows tube assemblies.

The pitch between the bellows tubes and the number of the bellows tubes of one bellows tube assembly among the plurality of the bellows tube assemblies may be different from the pitch between the bellows tubes and the number of the bellows tubes of another bellows tube assembly among the plurality of the bellows tube assemblies, and the pitch between the bellows tubes and the number of the bellows tubes of one bellows tube assembly among the plurality of the bellows tube assemblies may be same to the pitch between the bellows tubes and the number of the bellows tubes of the other bellows tube assembly among the plurality of the bellows tube assemblies.

The plurality of bellows tube assemblies may include a first bellows tube assembly including a plurality of bellows tube having a predetermined pitch between the bellows tubes and a number of the bellows tubes, a second bellows tube assembly including a plurality of bellows tubes having a predetermined pitch between the bellows tubes and a number of the bellows tubes different from the pitch between the bellows tubes and the number of the bellows tubes of the first bellows tube assembly, and a third bellows tube assembly including a plurality of bellows tubes having a predetermined pitch between the bellows tubes and a number of the bellows tubes same to the pitch between the bellows tubes and the number of the bellows tubes of the first bellows tube assembly.

The pitch of the first bellows tube assembly may be less than the pitch of the second bellows tube assembly, and the number of the bellows tubes of the first bellows tube assembly may be less than the number of the bellows tubes of the second bellows tube assembly.

The pitch between the bellows tubes of the first bellows tube assembly may be more than the pitch between the bellows tubes of the second bellows tube assembly, and the number of the bellows tubes of the first bellows tube assembly may be less than the number of the bellows tubes of the second bellows tube assembly.

The first bellows tube assembly, the second bellows tube assembly, and the third bellows tube assembly may be sequentially arranged.

The plurality of bellows tube assemblies may include a first bellows tube assembly including a plurality of bellows tubes having a predetermined pitch between the bellows tubes and a number of the bellows tubes, and a second bellows tube assembly including a plurality of bellows tubes having a predetermined pitch between the bellows tubes and a number of the bellows tubes different from the pitch between the bellows tubes and the number of the bellows tubes of the first bellows tube assembly.

The pitch between the bellows tubes of the first bellows tube assembly may be less than the pitch between the bellows tubes of the second bellows tube assembly, and the number of the bellows tubes of the first bellows tube assembly may be more than the number of the bellows tubes of the second bellows tube assembly.

The first bellows tube assembly and the second bellows tube assembly may be sequentially arranged.

According to an exemplary embodiment of the present disclosure as described above, it is possible to design the natural frequency of the recirculation pipe that does not overlap with the vibration frequency of the engine and the vibration frequency of the vehicle by changing the shapes of the bellows tubes.

BRIEF DESCRIPTION OF THE DRAWINGS

The objects, features and advantages of the present disclosure will be more apparent from the following detailed description in conjunction with the accompanying drawings, in which.

DETAILED DESCRIPTION OF THE EMBODIMENTS

Figure 1:
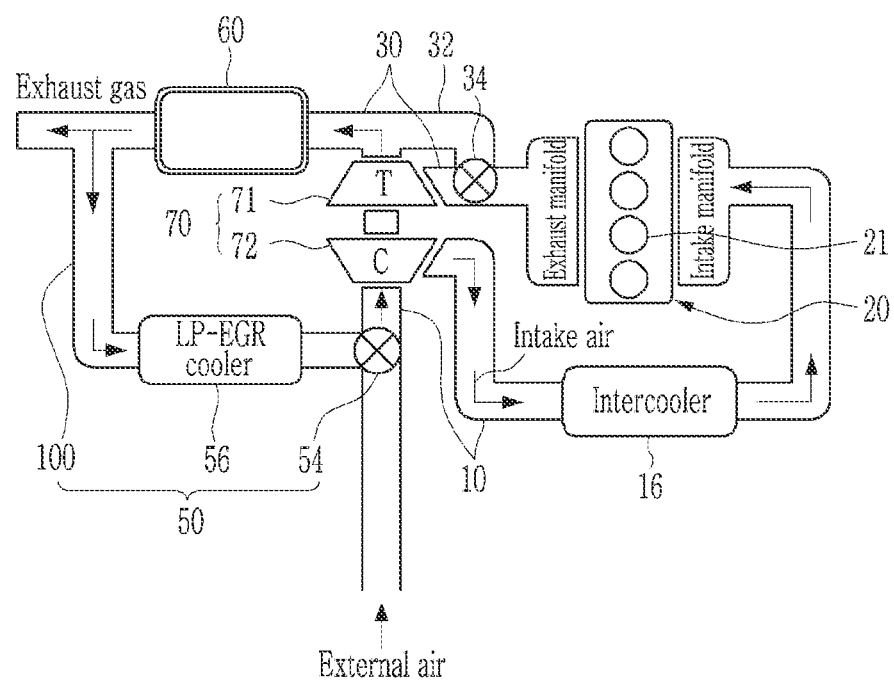
FIG. 1 is a schematic view illustrating an engine system according to an exemplary embodiment of the present disclosure.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

The drawings and description are to be regarded as illustrative in nature and not restrictive. Like reference numerals designate like elements throughout the specification.

Further, in the drawings, a size and thickness of each element are randomly represented for better understanding and ease of description, and the present disclosure is not limited thereto.

Hereinafter, a recirculation pipe and an engine system including the same according to an exemplary embodiment of the present disclosure will be described in detail with reference to accompanying drawings.

First, an engine system applied with a recirculation pipe according to an exemplary embodiment of the present disclosure will be described.

FIG. 1 is a schematic view illustrating an engine system according to an exemplary embodiment of the present disclosure.

As shown in FIG. 1, an engine system according to an exemplary embodiment of the present disclosure may include an engine 20, a turbocharger 70, an intercooler 16, and an EGR apparatus 50.

The engine 20 includes a plurality of combustion chambers 21 that generate driving power by combusting fuel. The engine 20 is provided with an intake line 10 through which intake gas to be supplied to the combustion chamber 21 flows, and an exhaust line 30 through which exhaust gas discharged from the combustion chamber 21 flows.

A catalytic converter 60, which removes various types of deleterious substances included in exhaust gas discharged from the combustion chamber 21, is provided in the exhaust line 30. To remove nitrogen oxide, the catalytic converter 60 may include a lean NOx trap (LNT), a diesel oxidation catalyst, and a diesel particulate filter.

The turbocharger 70 compresses intake gas (outside air+ recirculation gas), which inflows through the intake line 10, and supplies the intake gas to the combustion chamber 21. The turbocharger 70 includes a turbine 71 which is provided in the exhaust line 30 and rotates by exhaust gas discharged from the combustion chamber 21, and a compressor 72 which rotates in conjunction with the rotation of the turbine 71 and compresses intake gas.

The EGR apparatus 50, (exhaust gas recirculation apparatus) includes a recirculation pipe 100, an EGR cooler 56, and an EGR valve 54. While the LP-EGR apparatus is described as an example in the exemplary embodiment of the present disclosure, other types of EGR apparatuses (e.g., a high-pressure EGR apparatus) may be applied.

The recirculation pipe 100 branches off from the exhaust line 30 at a rear end of the turbocharger 70 and merges into the intake line 10. The EGR cooler 56 is connected to the recirculation pipe 100, and cools exhaust gas that flows through the recirculation pipe 100. The EGR valve 54 is disposed at a point at which the recirculation pipe 100 and the intake line 10 merge together, and adjusts the amount of exhaust gas that flows into the intake line 10.

The intercooler 16 cools intake gas, which inflows through the intake line 10, through a heat exchange with a coolant. That is, because the intake gas compressed by the turbocharger 70 expands as a temperature thereof increases, oxygen density of the intake gas supplied into the combustion chamber 21 decreases, and for this reason, it is difficult to output torque required for the engine 20. Therefore, the density of the intake gas is increased by cooling the intake gas by means of the intercooler 16, thereby improving combustion efficiency of the engine 20.

Hereinafter, the recirculation pipe according to an exemplary embodiment of the present disclosure will be described in detail with reference to accompanying drawings.

Figure 2:
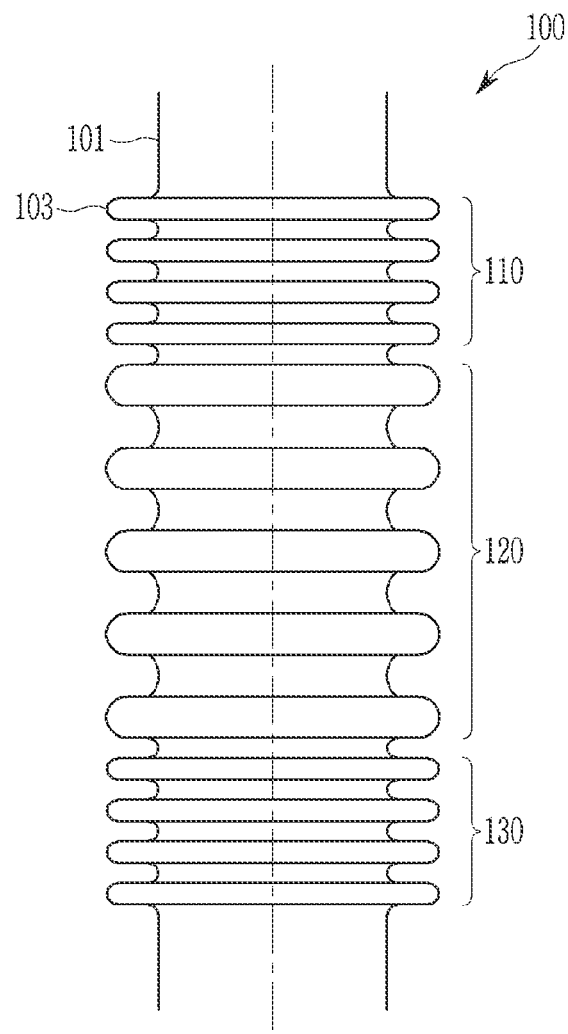
FIG. 2 is a top plan view illustrating a recirculation pipe of the engine system according to a first exemplary embodiment of the present disclosure.

FIG. 2 is a top plan view illustrating a recirculation pipe of the engine system according to a first exemplary embodiment of the present disclosure.

As shown in FIG. 2, the recirculation pipe 100 according to a first exemplary embodiment of the present disclosure may include a pipe body 101, and a plurality of bellows tube assemblies 110, 120 and 130 formed in the pipe body 101. The bellows tube assemblies 110, 120 and 130 may have different shapes with each other.

In the specification of the present disclosure, a distance between bellows tubes 103 formed in the pipe body 101 will be referred to as a pitch, the highest part of the bellows tube 103 will be referred to as a crest, the lowest part of the bellows tube 103 will be referred to as a root, and a distance from an exterior circumference pipe body 101 to the crest will be referred to as a height.

At least one of a pitch between the bellows tubes and a number of the bellows tubes of one bellows tube assembly among the plurality of bellows tube assemblies may be different from the pitch between the bellows tubes and the number of the bellows tubes of another bellows tube assembly among the plurality of bellows tube assemblies.

In the first exemplary embodiment of the present disclosure, the plurality of bellows tube assemblies includes a first to third bellows tube assembly 110, 120 and 130, and the first to third bellows tube assemblies 110, 120 and 130 are sequentially arranged. That is, the second bellows tube assembly 120 is formed adjacent to the first bellows tube assembly 110, and the third bellows tube assembly 130 is formed adjacent to the second bellows tube assembly 120.

In detail, the first bellows tube assembly 110 includes a plurality of first bellows tube 103, and the first bellows tubes 103 have a predetermined pitch between the bellows tubes and a predetermined number of the bellows tubes (e.g., four bellows tubes). For example, all the pitches of the bellows tubes 103 of the first bellows tube assembly 110 are the same, and the bellows tubes of a predetermined number (e.g., four bellows tubes) are formed in the pipe body 101.

The second bellows tube assembly 120 includes a plurality of second bellows tube, and the second bellows tubes 103 of the second bellows tube assembly 120 have a predetermined pitch between the bellows tubes and a predetermined number of the bellows tubes (e.g., five bellows tubes). At this time, at least one of the pitches between the bellows tubes and the number of the bellows tubes of the second bellows tube assembly 120 may be different from the pitch between the bellows tubes and the number of the bellows tubes of the first bellows tube assembly 110. For example, all the pitches of the bellows tubes 103 of the second bellows tube assembly 120 are the same, and the pitch of the second bellows tube assembly 120 is different from the pitch of the first bellows tube assembly 110.

In the first exemplary embodiment of the present disclosure, the pitch of the first bellows tube assembly 110 is less than the pitch of the second bellows tube assembly 120, and the number of the bellows tubes of the first bellows tube assembly 110 (e.g., four bellows tubes) is less than the number of the bellows tubes of the second bellows tube assembly 120 (e.g., five bellows tubes).

The third bellows tube assembly 130 includes a plurality of third bellows tube 103, the third bellows tube 103 of the third bellows tube assembly 130 have a predetermined pitch between the bellows tubes and a predetermined number of the bellows tubes (e.g., four bellows tubes). At this time, the pitch between the bellows tubes and the number of the bellows tubes of the third bellows tube assembly may be the same as the pith between the bellows tubes and the number of the bellows tubes of the first bellows tube assembly.

Figure 3:
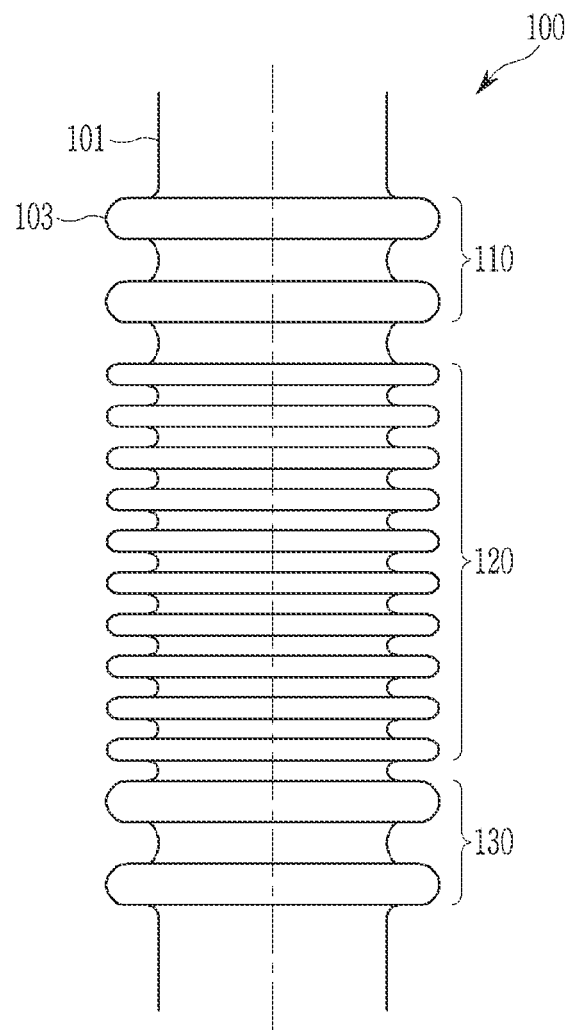
FIG. 3 is a top plan view illustrating a recirculation pipe of the engine system according to a second exemplary embodiment of the present disclosure.

FIG. 3 is a top plan view illustrating a recirculation pipe of the engine system according to a second exemplary embodiment of the present disclosure.

As shown in FIG. 3, the recirculation pipe 100 according to the second exemplary embodiment of the present disclosure may include a pipe body 101 and a plurality of bellows tube assemblies formed in the pipe body 101. At this time, the plurality of bellows tube assemblies may have different shapes.

At least one of the pitches and the number of the one of the bellows tube assembly among the plurality of the bellows tube assemblies may different from the pitch and the number of another bellows tube assembly among the plurality of the bellows tube assemblies.

In the second exemplary embodiment of the present disclosure, the plurality of bellows tube assemblies includes a first to third bellows tube assembly 110, 120 and 130, and the first to third bellows tube assembly 110, 120 and 130 are sequentially arranged. That is, the second bellows tube assembly 120 is formed adjacent to the first bellows tube assembly 110, and the third bellows tube assembly 130 is formed adjacent to the second bellows tube assembly 120.

In detail, the first bellows tube assembly 110 includes a plurality of first bellows tubes 103, and the first bellows tubes 103 have a predetermined pitch between the bellows tubes and a predetermined number of the bellows tubes (e.g., two bellows tubes). For example, all the pitches of the bellows tubes 103 of the first bellows tube assembly 110 are the same, and the bellows tubes of a predetermined number (e.g., two bellows tubes) are formed in the pipe body 101.

The second bellows tube assembly 120 includes a plurality of second bellows tubes, and the second bellows tubes 103 of the second bellows tube assembly 120 have a predetermined pitch between the bellows tubes and a predetermined number of the bellows tubes (e.g., five bellows tubes). At this time, at least one of the pitches between the bellows tubes and the number of the bellows tubes of the second bellows tube assembly 120 may be different from the pitch between the bellows tubes and the number of the bellows tubes of the first bellows tube assembly 110. For example, all the pitches between the bellows tubes of the second bellows tube assembly 120 are the same, and the pitch between the bellows tubes of the second bellows tube assembly 120 is different from the pitch between the bellows tubes of the first bellows tube assembly 110.

In the second exemplary embodiment of the present disclosure, the pitch between the bellows tubes of the first bellows tube assembly 110 is greater than the pitch between the bellows tubes of the second bellows tube assembly 120, and the number of the bellows tubes of the first bellows tube assembly 110 (e.g., two bellows tubes) is less than the number of the bellows tubes of the second bellows tube assembly 120 (e.g., ten bellows tubes).

The third bellows tube assembly 130 includes a plurality of third bellows tubes, and the third bellows tube assembly 130 has a predetermined pitch between the bellows tubes and a predetermined number of the bellows tubes (e.g., four bellows tubes). At this time, the pitch between the bellows tubes and the number of the bellows tubes of the third bellows tube assembly may be same to the pith between the bellows tubes and the number of the bellows tubes of the first bellows tube assembly.

Figure 4:
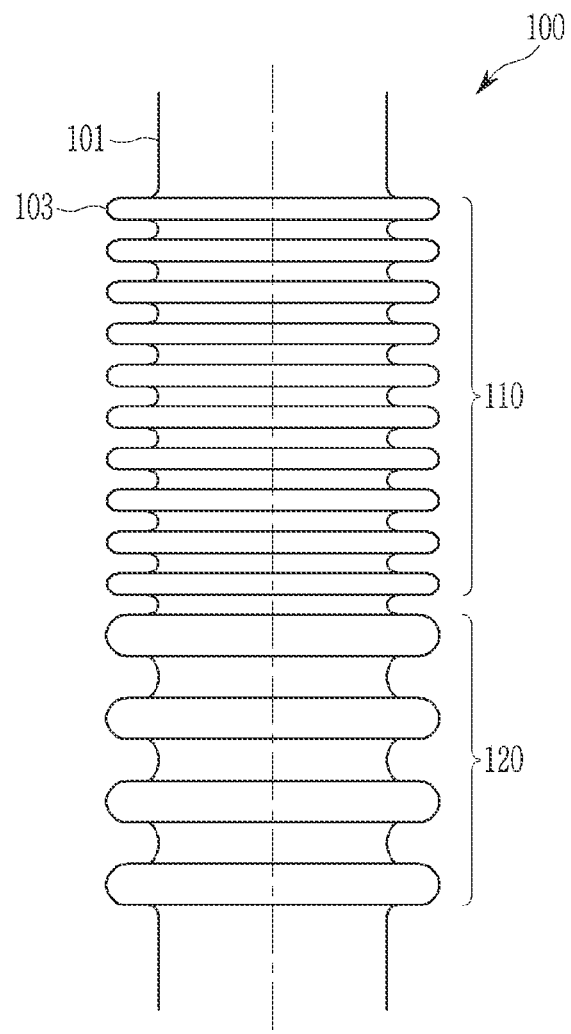
FIG. 4 is a top plan view illustrating a recirculation pipe of the engine system according to a third exemplary embodiment of the present disclosure.

FIG. 4 is a top plan view illustrating a recirculation pipe of the engine system according to a third exemplary embodiment of the present disclosure.

As shown in FIG. 4, the recirculation pipe 100 according to the third exemplary embodiment of the present disclosure may include a pipe body 101, and a plurality of bellows tube assemblies 110 and 120 formed in the pipe body 101. The bellows tube assemblies 110 and 120 have different shapes with each other.

At least one of the pitches and the number of the one of the bellows tube assembly among the plurality of the bellows tube assemblies may be different from the pitch and the number of another bellows tube assembly among the plurality of the bellows tube assemblies.

In the third exemplary embodiment of the present disclosure, the bellows tube assemblies include a first and a second bellows tube assembly 110 and 120, and the first and second bellows tube assemblies 110 and 120 are sequentially arranged. That is, the second bellows tube assembly 120 is formed adjacent to the first bellows tube assembly 110.

In detail, the first bellows tube assembly 110 includes a plurality of first bellows tubes 103, and the first bellows tubes 103 have a predetermined pitch between the bellows tubes and a predetermined number of the bellows tubes (e.g., ten bellows tubes). For example, all the pitches of the bellows tubes 103 of the first bellows tube assembly 110 are the same, and the bellows tubes of a predetermined number (e.g., ten bellows tubes) are formed in the pipe body 101.

The second bellows tube assembly 120 includes a plurality of second bellows tube, and the second bellows tubes 103 of the second bellows tube assembly 120 have a predetermined pitch between the bellows tubes and a predetermined number of the bellows tubes (e.g., four bellows tubes). At this time, at least one of the pitches between the bellows tubes and the number of the bellows tubes of the second bellows tube assembly 120 may be different from the pitch between the bellows tubes and the number of the bellows tubes of the first bellows tube assembly 110. For example, all the pitches of the bellows tubes of the second bellows tube assembly 120 are the same. But at least one of the pitches between the bellows tubes and the number of the bellows tubes of the second bellows tube assembly 120 may be different from the pitch between the bellows tubes and the number of the bellows tubes of the first bellows tube assembly 110.

In the third exemplary embodiment of the present disclosure, the pitch between the bellows tubes of the first bellows tube assembly 110 is less than the pitch between the bellows tubes of the second bellows tube assembly 120, and the number of the bellows tubes of the first bellows tube assembly 110 (e.g., ten bellows tubes) is more than the number of the bellows tubes of the second bellows tube assembly 120 (e.g., four bellows tubes).

Figure 5:
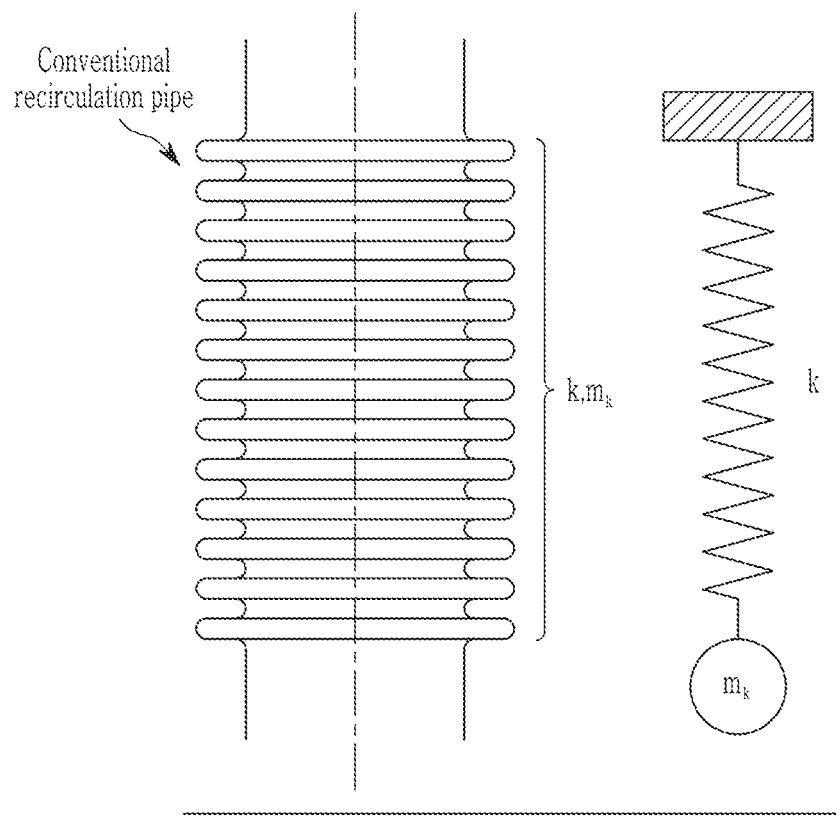
FIG. 5 illustrates a method of determining a natural frequency of a conventional recirculation pipe.
Figure 6:
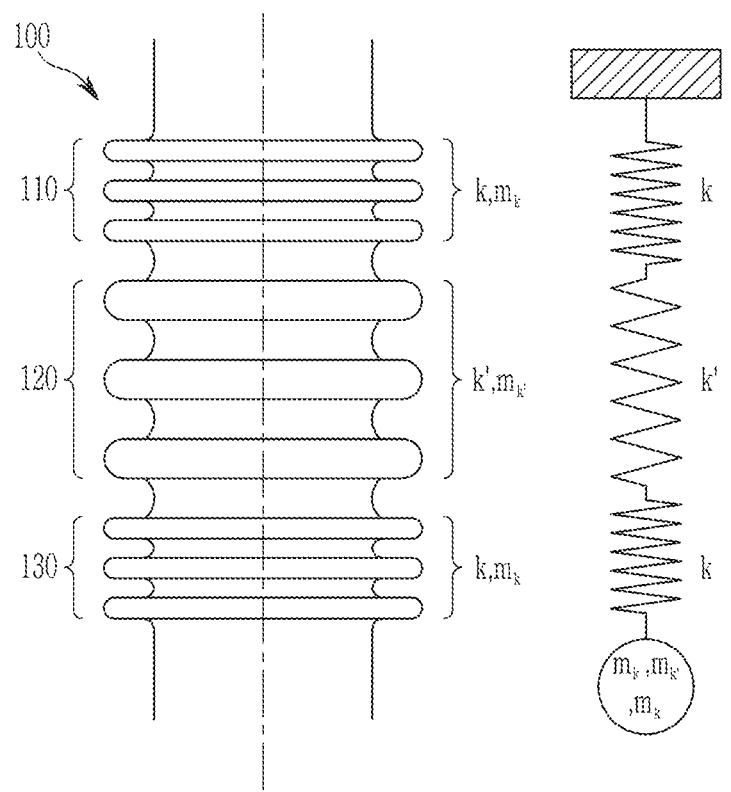
FIG. 6 illustrates a method of determining a natural frequency according to an exemplary embodiment of the present disclosure.

FIG. 5 is a drawing for explaining a method of determining a natural frequency of a conventional recirculation pipe. FIG. 6 is a drawing for explaining a method of determining a natural frequency according to an exemplary embodiment of the present disclosure.

The recirculation pipe 100 connecting the intake line 100 (or exhaust line 30) of the engine 20 and the EGR cooler 56 must have strength and damping performance required in the vehicle. And for the convenience of assembly, the recirculation pipe 100 should allow displacement in the axial direction. To this end, the recirculation pipe 100 may be formed in a bellows type.

However, in order to satisfy such performances, it is difficult to change the natural frequency of the recirculation pipe 100 due to the limitations of design factors such as the number and pitch of the bellows tube 103 of the bellows type recirculation pipe 100.

The conventional recirculation pipe 100 may be plotted as a two-dimensional model with mass (m) and strength (k). At this time, it can be seen that the natural frequency of the recirculation pipe 100 is determined only as a function of mass (m) and strength (k) (see FIG. 5).

However, since the recirculation pipe 100 according to an exemplary embodiment of the present disclosure includes a plurality of bellows tube assemblies having different shapes with each other, the natural frequency of the recirculation pipe 100 according to an exemplary embodiment of the present disclosure may be plotted as a multi-dimensional model having plurality of mass ($m_k$, $m_{k'}$) and a plurality of strengths (k, k'). Therefore, it can be seen that the natural frequency of the recirculation pipe 100 is determined as a function of a plurality of masses and a plurality of strengths (see FIG. 6).

For example, the natural frequency of the recirculation pipe 100 according to an exemplary embodiment of the present disclosure may be determined as a function of the mass ($m_k$) and strength (k) of the first bellows tube assembly 110, the mass ($m_{k'}$) and strength (k') of the second bellows tube assembly 120, and the mass ($m_k$) and the strength (k) of the third bellows tube assembly 130. That is, as the design factor that determines the natural frequency of the recirculation pipe 100 increases, the design degree of freedom that determines the natural frequency of the recirculation pipe 100 increases. Therefore, it is possible to determine the natural frequency of the recirculation pipe 100 that do not overlap with the vibration frequency of the engine and the vibration frequency of the vehicle by changing the pitch between the bellows tubes and/or the number of the bellows tubes.

Figure 7:
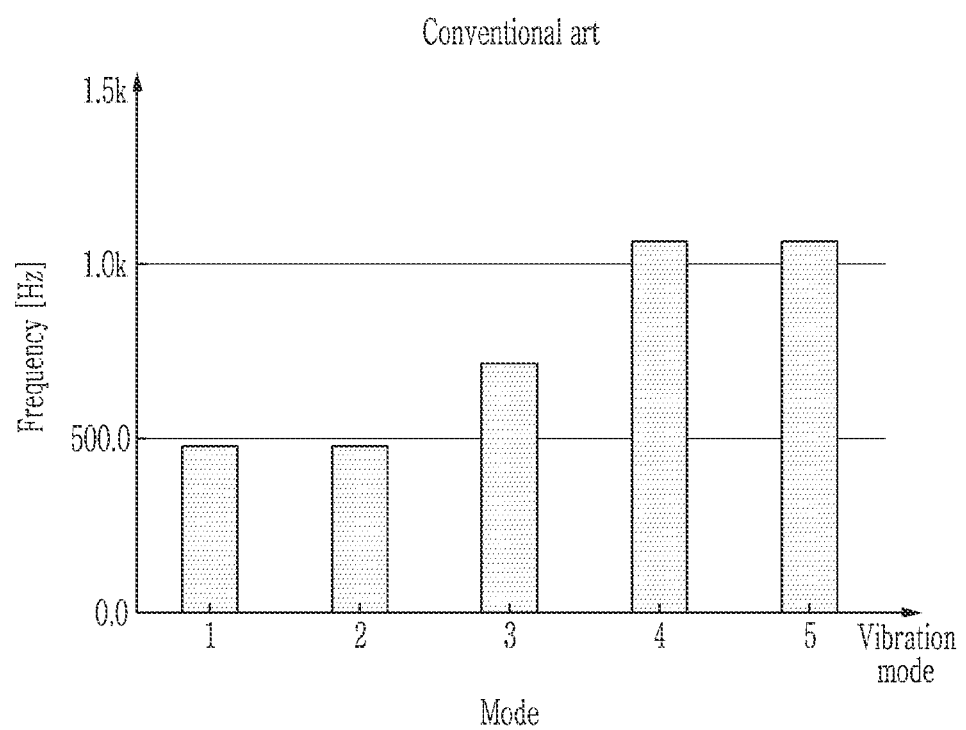
FIG. 7 is a graph illustrating a natural frequency of a recirculation pipe according to a conventional recirculation pipe.
Figure 8:
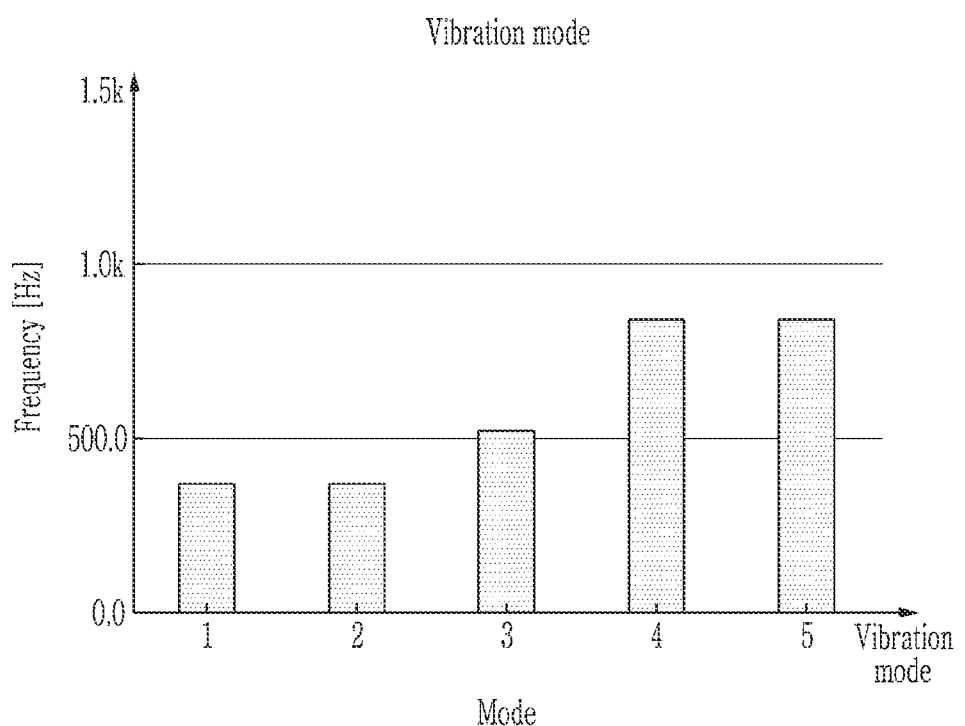
FIG. 8 is a graph illustrating a natural frequency of a recirculation pipe according to an exemplary embodiment of the present disclosure.

FIG. 7 is a graph illustrating a natural frequency of a recirculation pipe according to a conventional recirculation pipe. FIG. 8 is a graph illustrating a natural frequency of a recirculation pipe according to an exemplary embodiment of the present disclosure.

Referring to FIG. 7, it can be seen that the natural frequency of the recirculation pipe according to the conventional art is about 500 Hz at a first mode, about 500 Hz at a second mode, about 750 Hz at a third mode, about 1,100 Hz at a fourth mode, and about 1,100 Hz at a fifth mode.

However, as shown in FIG. 8, it can be seen that the natural frequency of the recirculation pipe according to an exemplary embodiment of the present disclosure is about 350 Hz in a first mode, about 350 Hz in a second mode, about 510 Hz in a third mode, about 800 Hz in a fourth mode, and about 800 Hz in a fifth mode.

That is, by simply changing the shape of the bellows tube 103 of the recirculation pipe 100, the natural frequency of the recirculation pipe 100 can be reduced by about 30% or more as compared to the conventional art. In this way, according to an exemplary embodiment of the present disclosure, even though the mass of the recirculation pipe 100 is not increased or an additional structure is not added to the recirculation pipe 100, the natural frequency of the recirculation pipe 100 can be determined as a target frequency by simply changing the shape (e.g., pitch and/or number of bellows tubes).

While this disclosure has been described in connection with what is presently considered to be practical exemplary embodiments, it is to be understood that the present disclosure is not limited to the disclosed embodiments. On the contrary, it is intended to cover various modifications and equivalent arrangements included within the spirit and scope of the appended claims.

What is claimed is:

1. A recirculation pipe of an EGR apparatus, the recirculation pipe comprising:
   a pipe body; and
   a plurality of bellows tube assemblies formed in the pipe body and including a plurality of bellows tubes;
   wherein one bellows tube assembly among the plurality of bellows tube assemblies and another bellows tube assembly among the plurality of bellows tube assemblies have different shapes,
   wherein the pitch between the bellows tubes and the number of the bellows tubes of one bellows tube assembly among the plurality of the bellows tube assemblies is different from the pitch between the bellows tubes and the number of the bellows tubes of another bellows tube assembly among the plurality of the bellows tube assemblies, and
   the pitch between the bellows tubes and the number of the bellows tubes of one bellows tube assembly among the plurality of the bellows tube assemblies is the same as the pitch between the bellows tubes and the number of the bellows tubes of the other bellows tube assembly among the plurality of the bellows tube assemblies;
   wherein the plurality of bellows tube assemblies comprises:
   a first bellows tube assembly including a plurality of bellows tubes having a predetermined pitch between the bellows tubes and a number of the bellows tubes;
   a second bellows tube assembly including a plurality of bellows tubes having a predetermined pitch between the bellows tubes and a number of the bellows tubes that is different from the pitch between the bellows tubes and the number of the bellows tubes of the first bellows tube assembly; and
   a third bellows tube assembly including a plurality of bellows tubes having a predetermined pitch between the plurality of bellows tubes and a number of the bellows tubes that is the same as the pitch between the bellows tubes and the number of the bellows tubes of the first bellows tube assembly.

2. The recirculation pipe of claim 1, wherein:
   the pitch of the first bellows tube assembly is less than the pitch of the second bellows tube assembly, and
   the number of the bellows tubes of the first bellows tube assembly is less than the number of the bellows tubes of the second bellows tube assembly.

3. The recirculation pipe of claim 1, wherein:
   the pitch between the bellows tubes of the first bellows tube assembly is greater than the pitch between the bellows tubes of the second bellows tube assembly, and
   the number of the bellows tubes of the first bellows tube assembly is less than the number of the bellows tubes of the second bellows tube assembly.

4. The recirculation pipe of claim 1, wherein:
   the first bellows tube assembly, the second bellows tube assembly, and the third bellows tube assembly are sequentially arranged.

5. An engine system comprising:
   a plurality of combustion chambers generating power by burning fuel;
   an intake line through which an intake air supplied to the combustion chamber flows;
   an exhaust line through which an exhaust gas exhausted from the combustion chamber flows; and an EGR apparatus comprising a recirculation pipe connecting the exhaust line and the intake line to recirculate the exhaust gas flowing through the exhaust line to the combustion chamber;

wherein the recirculation pipe comprises:

a pipe body; and a plurality of bellows tube assemblies formed in the pipe body and including a plurality of bellows tubes;

wherein one bellows tube assembly among the plurality of bellows tube assemblies and another bellows tube assembly among the plurality of bellows tube assemblies have different shapes;

the pitch between the bellows tubes and the number of the bellows tubes of one bellows tube assembly among the plurality of the bellows tube assemblies is different from the pitch between the bellows tubes and the number of the bellows tubes of another bellows tube assembly among the plurality of the bellows tube assemblies, and the pitch between the bellows tubes and the number of the bellows tubes of one bellows tube assembly among the plurality of the bellows tube assemblies is the same as the pitch between the bellows tubes and the number of the bellows tubes of the other bellows tube assembly among the plurality of the bellows tube assemblies, wherein the plurality of bellows tube assemblies comprises:

a first bellows tube assembly including a plurality of bellows tubes having a predetermined pitch between the bellows tubes and a number of the bellows tubes;

a second bellows tube assembly including a plurality of bellows tubes having a predetermined pitch between the bellows tubes and a number of the bellows tubes that is different from the pitch between the bellows tubes and the number of the bellows tubes of the first bellows tube assembly; and a third bellows tube assembly including a plurality of bellows tubes having a predetermined pitch between the bellows tubes and a number of the bellows tubes that is the same as the pitch between the bellows tubes and the number of the bellows tubes of the first bellows tube assembly.

6. The engine system of claim 5, wherein:

the pitch of the first bellows tube assembly is less than the pitch of the second bellows tube assembly, and the number of the bellows tubes of the first bellows tube assembly is less than the number of the bellows tubes of the second bellows tube assembly.

7. The engine system of claim 5, wherein:

the pitch between the bellows tubes of the first bellows tube assembly is greater than the pitch between the bellows tubes of the second bellows tube assembly, and the number of the bellows tubes of the first bellows tube assembly is less than the number of the bellows tubes of the second bellows tube assembly.

8. The engine system of claim 5, wherein:

the first bellows tube assembly, the second bellows tube assembly, and the third bellows tube assembly are sequentially arranged.

* * * * *